US012269923B2

(12) United States Patent
Baumann et al.

(10) Patent No.: US 12,269,923 B2
(45) Date of Patent: Apr. 8, 2025

(54) MOLDING COMPOUND CONTAINING POLYETHER BLOCK AMIDE (PEBA)

(71) Applicant: Evonik Operations GmbH, Essen (DE)

(72) Inventors: Franz-Erich Baumann, Duelmen (DE); Kathrin Salwiczek, Recklinghausen (DE); Alexander Richter, Haltern am See (DE)

(73) Assignee: Evonik Operations GmbH, Essen (DE)

( * ) Notice: Subject to any disclaimer, the term of this patent is extended or adjusted under 35 U.S.C. 154(b) by 655 days.

(21) Appl. No.: 17/414,674

(22) PCT Filed: Oct. 9, 2019

(86) PCT No.: PCT/EP2019/077424
§ 371 (c)(1),
(2) Date: Jun. 16, 2021

(87) PCT Pub. No.: WO2020/126148
PCT Pub. Date: Jun. 25, 2020

(65) Prior Publication Data
US 2022/0025118 A1 Jan. 27, 2022

(30) Foreign Application Priority Data
Dec. 19, 2018 (EP) ..................................... 18213932

(51) Int. Cl.
| | |
|---|---|
| C08G 69/40 | (2006.01) |
| B29B 9/12 | (2006.01) |
| B29K 71/00 | (2006.01) |
| B29K 77/00 | (2006.01) |
| B29K 105/00 | (2006.01) |
| C08J 5/18 | (2006.01) |

(52) U.S. Cl.
CPC ............... *C08G 69/40* (2013.01); *B29B 9/12* (2013.01); *C08J 5/18* (2013.01); *B29K 2071/00* (2013.01); *B29K 2077/00* (2013.01); *B29K 2105/0085* (2013.01); *C08J 2377/00* (2013.01)

(58) Field of Classification Search
CPC ......... C08J 2377/00; C08J 5/18; C08G 69/40; B29K 2071/00; B29K 2077/00; B29K 2105/0085; B29B 9/12
See application file for complete search history.

(56) References Cited

U.S. PATENT DOCUMENTS

| | | | |
|---|---|---|---|
| 4,230,838 A * | 10/1980 | Foy | ........................ C08G 69/44 525/411 |
| 4,438,240 A | 3/1984 | Tanaka et al. | |
| 6,884,485 B2 | 4/2005 | Baumann et al. | |
| 7,491,792 B2 | 2/2009 | Monsheimer et al. | |
| 7,582,342 B2 | 9/2009 | Baumann et al. | |
| 8,003,201 B2 | 8/2011 | Luetzeler et al. | |
| 8,303,873 B2 | 11/2012 | Dowe et al. | |
| 8,357,455 B2 | 1/2013 | Baumann et al. | |
| 8,470,433 B2 | 6/2013 | Hager et al. | |
| 8,535,811 B2 | 9/2013 | Alting et al. | |
| 8,614,005 B2 | 12/2013 | Wursche et al. | |
| 8,999,086 B2 | 4/2015 | Bollmann et al. | |
| 10,040,938 B2 | 8/2018 | Nitsche et al. | |
| 2003/0162899 A1 | 8/2003 | Baumann et al. | |
| 2005/0014842 A1 | 1/2005 | Baumann et al. | |
| 2006/0189784 A1 | 8/2006 | Monsheimer et al. | |
| 2006/0281873 A1 | 12/2006 | Luetzeler et al. | |
| 2007/0036998 A1 | 2/2007 | Dowe et al. | |
| 2007/0104971 A1 | 5/2007 | Wursche et al. | |
| 2008/0119632 A1 | 5/2008 | Baumann et al. | |
| 2008/0166529 A1 | 7/2008 | Hager et al. | |
| 2008/0213552 A1 | 9/2008 | Hager et al. | |
| 2008/0261010 A1 | 10/2008 | Wursche et al. | |
| 2011/0217559 A1 | 9/2011 | Bollmann et al. | |
| 2011/0244209 A1 | 10/2011 | Alting et al. | |
| 2012/0094116 A1 | 4/2012 | Wursche et al. | |
| 2014/0037937 A1 | 2/2014 | Wursche et al. | |
| 2015/0086737 A1 | 3/2015 | Nitsche et al. | |
| 2015/0086738 A1 | 3/2015 | Nitsche et al. | |

(Continued)

FOREIGN PATENT DOCUMENTS

GB 2 044 785 10/1980

OTHER PUBLICATIONS

Wahab et al "Development of PEBAX Based Membrane for Gas Separation: A Review", International Journal of Membrane Science and Technology, 2015, 2, 78-84 (Year: 2015).*
Bondar et al "Gas Transport Properties of Poly(ether-b-amide) Segmented Block Copolymers", Journal of Polymer Science: Part B: Polymer Physics, vol. 38, 2051-2062 (2000). (Year: 2000).*
Samanta et al "Polyamides based on the renewable monomer, 1,13-tridecane diamine II: Synthesis and characterization of nylon 13,6", Polymer, vol. 54, Issue 3, Feb. 5, 2013, pp. 1141-1149 (Year: 2013).*

(Continued)

*Primary Examiner* — Frances Tischler
*Assistant Examiner* — Gennadiy Mesh
(74) *Attorney, Agent, or Firm* — Grüneberg and Myers PLLC

(57) ABSTRACT

A molding compound contains polyether block amide (PEBA) based on a subunit 1 made of at least one linear aliphatic diamine having 5 to 15 C atoms and at least one linear aliphatic or aromatic dicarboxylic acid having 6 to 16 C atoms. The PEBA also contains a subunit 2 made of at least one polyether diol having at least 3 C atoms per ether oxygen and primary OH groups at the chain ends. The sum of the C atoms of diamine and dicarboxylic acid is odd and is 19 or 21, and the number-average molar mass of the subunit 2 is 200 to 900 g/mol. A molded object can be created from the molding compound, which can be a molded part, a film, a bristle, a fiber, or a foam.

10 Claims, No Drawings

(56) References Cited

U.S. PATENT DOCUMENTS

2021/0371651 A1  12/2021  Salwiczek et al.

OTHER PUBLICATIONS

Zhu et al "The Brill transition in polyether-b-amide segmented copolymers and composition dependence", European Polymer Journal, pp. 334-346 Available online Jun. 10, 2017 (Year: 2017).*

Xiaowen Cui et al "Synthesis and characterization of novel polyamides based on tridecanedioic acid: Nylons 3 13, 5 13, 6 13, 7 13, 9 13, 10 13, 11 13", e-Polymers 2004, No. 068. (Year: 2004).*

Xiaowen Cui et al "Synthesis and characterization of novel even-odd nylons based on undecanedioic acid", European Polymer Journal 40 (2004) 1111-1118 (Year: 2004).*

International Search Report issued Jan. 20, 2020 in PCT/EP2019/077424 with English translation, 5 pages.

Written Opinion issued Jan. 20, 2020 in PCT/EP2019/077424 with English translation, 8 pages.

Search Report issued Jul. 10, 2019 in European Application No. 18213932.9, 7 pages.

U.S. Appl. No. 11/816,595, filed Mar. 25, 2008, 2008/0166529, Hager et al.

U.S. Appl. No. 11/816,556, filed Jan. 28, 2008, 2008/0261010, Wursche et al.

U.S. Appl. No. 14/050,901, filed Oct. 10, 2013, 2014/0037937, Wursche et al.

U.S. Appl. No. 11/586,526, filed Oct. 26, 2006, 2007/0104971, Wursche et al.

U.S. Appl. No. 14/489,632, filed Sep. 18, 2014, 2015/0086738, Nitsche et al.

U.S. Appl. No. 17/285,373, filed Apr. 14, 2021, 2021/0371651, Salwiczek et al.

U.S. Appl. No. 17/285,354, filed Apr. 14, 2021, Salwiczek et al.

* cited by examiner

MOLDING COMPOUND CONTAINING POLYETHER BLOCK AMIDE (PEBA)

CROSS-REFERENCE TO RELATED APPLICATIONS

This application is the National Stage entry under § 371 of International Application No. PCT/EP2019/077424, filed on Oct. 9, 2019, and which claims the benefit of priority to European Application No. 18213932.9, filed on Dec. 19, 2018. The content of each of these applications is hereby incorporated by reference in its entirety.

BACKGROUND OF THE INVENTION

Field of the Invention

The present invention relates to a moulding composition comprising polyether block amide (PEBA), to a moulded article produced therefrom and to the use thereof.

Description of Related Art

Polyether block amides (PEBA) are block copolymers which are obtained by polycondensation of (oligo)polyamides, in particular acid-regulated polyamides, with alcohol-terminated or amino-terminated polyethers. Acid-regulated polyamides have carboxylic acid end groups in excess. Those skilled in the art refer to the polyamide blocks as hard blocks and the polyether blocks as soft blocks. The production thereof is known in principle. DE2712987A1 (U.S. Pat. No. 4,207,410) describes polyamide elastomers of this type, composed of lactams containing 10-12 carbon atoms, dicarboxylic acids and polyether diols. The products obtainable according to this document are distinguished by long-lasting flexibility and ductility even at low temperatures, but they are already cloudy to opaque in mouldings of moderate layer thickness and, on longer-term storage at room temperature, are conspicuous due to surface deposits having a mildew-like appearance. Similarly structured polyamide elastomers, assembled from diamines containing 6-20 carbon atoms, aliphatic or aromatic dicarboxylic acids and polyether diols, are known from EP0095893. Distinctive properties are increased heat distortion resistance and flexibility. No data regarding translucency of the mouldings and formation of deposits can be gathered from this document.

PA 11-based and PA 12-based PEBA moulding compositions also stand out for negative reasons due to an opaque, cloudy appearance and formation of surface deposits. It was further observed that they have a high level of deposits with simultaneously low translucency. Current moulding compositions are therefore of little suitability for applications.

SUMMARY OF THE INVENTION

To this end, it was an object of the present invention to provide suitable moulding compositions, which are associated with a high translucency with low haze and freedom from deposits even over a relatively long period of time.

This object was achieved with a moulding composition comprising polyether block amide (PEBA) based on a subunit 1, composed of at least one linear aliphatic diamine containing 5 to 15 carbon atoms, preferably 6 to 12 carbon atoms and at least one linear aliphatic dicarboxylic acid containing 8 to 16 carbon atoms, preferably 8 to 14 carbon atoms, and on a subunit 2, composed of at least one polyether diol containing at least 3 carbon atoms per ether oxygen and primary OH groups at the chain ends. The sum total of the carbon atoms from diamine and dicarboxylic acid is an odd number and is 19 or 21 carbon atoms: the number-average molar mass of the subunit 2 is 200 to 900 g/mol. Preferably, the molar mass of the subunit is 400 to 700 g/mol. Subunit 1 therefore forms the part generally referred to as the hard block, subunit 2 forms the soft block. The term "linear" is to be understood as meaning that the carbon chains are unbranched.

DETAILED DESCRIPTION OF THE INVENTION

In one preferred embodiment, the number-average molar mass of the subunit 1 is 250 to 4500 g/mol, more preferably 400 to 2500 g/mol, even more preferably 400 to 2000 g/mol, most preferably 500 to 1800 g/mol. This leads to a material with higher translucency and simultaneously reduced formation of deposits.

The polyether diol of the PEBA is preferably selected from polypropane-1,3-diol, polytetramethylene glycol and mixtures thereof.

The sum total of the carbon atoms from diamine and dicarboxylic acid in the PEBA is an odd number. It is 19 or 21. Preferably, the sum total is 19.

It is furthermore preferable for the number of carbon atoms in the diamine to be an even number and for the number of carbon atoms in the acid to be an odd number.

Suitable polyamides of subunit 1 are selected, by way of example, from 5,14, 5,16, 6,13, 6,15, 7,12, 7,14, 8,11, 8,13, 9,10, 9,12, 10,9, 10,11, 11,8, 11,10, 12,7, 12,9, 13,6, 13,8. It is furthermore preferable for the subunit 1 to be selected from nylon-6,13, nylon-10,9 and nylon-12,9.

The invention further provides a moulded article produced from the moulding composition according to the invention. The moulded article is preferably a moulding, a film, a bristle, a fibre or a foam. The moulded article may for example be produced by compression-moulding, foaming, extrusion, coextrusion, blow moulding, 3D blow moulding, coextrusion blow moulding, coextrusion 3D blow moulding, coextrusion suction blow moulding or injection moulding. Processes of this kind are known to those skilled in the art.

The invention further provides the use of the moulded article according to the invention, which may for example be used as a fibre composite component, shoe sole, top sheets for skis or snowboards, line for media, spectacle frame, design article, sealing material, body protection, insulating material or housing part provided with a film.

EXAMPLES

Preparation of the Polyether Block Amides (PEBA)
General Procedure for Preparing the PEBA:

The diamine, 10% of the mass thereof of deionized (DI) water, dicarboxylic acid and the polyether diol polytetrahydrofuran (PTHF) are initially charged successively at below 60° C. in the feed tank of a 100-l double-tank polycondensation installation, provided with an anchor stirrer. PTHF forms the subunit 2. Based on the polyether diol, 0.1% Irganox® 1098 (BASF SE) is added as process stabilizer. Based on the total solids content, 0.3% 50%-strength hypophosphorous acid is added as catalyst. After repeated pressure inertization with $N_2$, the tank contents are heated to 180° C.-190° C.; at 160° C. the stirrer is engaged. The starting materials are stirred for 1 hour and are thereafter transferred into the polycondensation reactor, provided with a helical stirrer and torque recorder. After pressure has been equalized between the two vessels, the reactor valve is closed and the contents are brought up to 245° C. within 6 hours under stirring at 25 rpm. Upon reaching 21 bar autogenous pressure—normally between 210° C. and 225° C. internal temperature—a two-hour pressure maintenance stage is observed, after which depressurization is performed continuously to atmospheric pressure under further raising of the temperature. After 3-4 hours at atmospheric pressure, reduced pressure is applied within 5 hours until a final reduced pressure of 40-60 mbar is reached. Further stirring is performed under these conditions until the desired final torque is reached. The melt is extruded into a water bath, pelletized and dried at 70° C.-90° C. in a tumble dryer to a water content<0.1%.

Molar Ratio of Subunit 1 to Subunit 2:

Examples 1 to 14, 51-55 and 58-80: 100:103; Examples 15-35, 48-50 and 58-57: 100:102; Examples 38-40: 100:105.

Subsequent to drying according to the process described in DE4301801A1 in solid phase at 130° C.-135° C., 0.95 wt. % of a stabilizer mixture, based on the total weight of PEBA and stabilizer, was added to some of the PEBA (hereinafter identified with "st").

The PEBA prepared are summarized in Table 1 which follows. The molar mass of the subunit 1 results from the molar ratio of the dicarboxylic acid used and the diamine.

TABLE 1

PEBA prepared

| Experiment | Diamine | Initial weight of diamine | Dicarboxylic acid | Initial weight of dicarboxylic acid | Mn of subunit 1 | Mn of pTHF | Initial weight of pTHF | Product |
|---|---|---|---|---|---|---|---|---|
| 1 | 6 | 11.999 | 10 | 23.694 | 2300 | 650 | 9.286 | PEBA 6.10 |
| 2 | 6 | 8.823 | 10 | 20.186 | 1100 | 650 | 15.955 | PEBA 6.10 |
| 3 | 6 | 7.16 | 10 | 18.35 | 800 | 650 | 19.447 | PEBA 6.10 |
| 4 | 6 | 11.999 | 10 | 23.694 | 2300 | 650 | 9.286 | PEBA 6.10-st |
| 5 | 6 | 8.823 | 10 | 20.186 | 1100 | 650 | 15.955 | PEBA 6.10-st |
| 6 | 6 | 7.16 | 10 | 18.35 | 800 | 650 | 19.447 | PEBA 6.10-st |
| 7 | 6 | 10.35 | 13 | 25.219 | 2300 | 650 | 9.4 | PEBA 6.13 |
| 8 | 6 | 7.396 | 13 | 21.446 | 1100 | 650 | 16.122 | PEBA 6.13 |
| 9 | 6 | 5.848 | 13 | 19.476 | 800 | 650 | 19.632 | PEBA 6.13 |
| 10 | 6 | 4.379 | 13 | 17.606 | 600 | 650 | 22.964 | PEBA 6.13 |
| 11 | 6 | 10.36 | 13 | 25.219 | 2300 | 650 | 9.4 | PEBA 6.13-st |
| 12 | 6 | 7.395 | 13 | 21.446 | 1100 | 650 | 16.122 | PEBA 6.13-st |
| 13 | 6 | 5.848 | 13 | 19.476 | 800 | 650 | 19.632 | PEBA 6.13-st |
| 14 | 6 | 4.379 | 13 | 17..606 | 600 | 650 | 22.964 | PEBA 6.13-st |
| 15 | 10 | 14.986 | 10 | 20.472 | 2268 | 650 | 9.521 | PEBA 10.10 |
| 16 | 10 | 10.927 | 10 | 17.755 | 1083 | 650 | 16.282 | PEBA 10.10 |
| 17 | 10 | 8.758 | 10 | 16.303 | 780 | 650 | 19.894 | PEBA 10.10 |
| 19 | 10 | 15.296 | 13 | 23.832 | 4096 | 650 | 5.859 | PEBA 10.13 |
| 20 | 10 | 13.176 | 13 | 22.196 | 2268 | 650 | 9.607 | PEBA 10.13 |
| 21 | 10 | 11.211 | 13 | 20.68 | 1509 | 650 | 13.08 | PEBA 10.13 |
| 22 | 10 | 9.243 | 13 | 19.162 | 1068 | 650 | 16.558 | PEBA 10.13 |
| 23 | 10 | 15.296 | 13 | 23.832 | 4096 | 650 | 5.859 | PEBA 10.13-st |
| 24 | 10 | 13.176 | 13 | 22.196 | 2268 | 650 | 9.607 | PEBA 10.13-st |
| 25 | 10 | 11.211 | 13 | 20.68 | 1509 | 650 | 13.08 | PEBA 10.13-st |
| 26 | 10 | 9.243 | 13 | 19.162 | 1068 | 650 | 16.558 | PEBA 10.13-st |
| 27 | 10 | 17.959 | 9 | 21.246 | 4096 | 650 | 5.781 | PEBA 10.9 |
| 28 | 10 | 15.685 | 9 | 19.806 | 2268 | 650 | 9.487 | PEBA 10.9 |
| 29 | 10 | 13.574 | 9 | 18.469 | 1509 | 650 | 12.928 | PEBA 10.9 |
| 30 | 10 | 11.455 | 9 | 17.128 | 1068 | 650 | 16.38 | PEBA 10.9 |
| 31 | 10 | 7.481 | 9 | 14.612 | 600 | 650 | 22.856 | PEBA 10.9 |
| 32 | 10 | 17.959 | 9 | 21.246 | 4096 | 650 | 5.781 | PEBA 10.9-st |
| 33 | 10 | 15.685 | 9 | 19.806 | 2268 | 650 | 9.487 | PEBA 10.9-st |
| 34 | 10 | 13.574 | 9 | 18.469 | 1509 | 650 | 12.928 | PEBA 10.9-st |
| 35 | 10 | 11.455 | 9 | 17.128 | 1068 | 650 | 16.38 | PEBA 10.9-st |
| 36 | 6 | 11.111 | 13 | 25.38 | 4000 | 1000 | 8.449 | PEBA 6.13 |
| 37 | 6 | 9.31 | 13 | 22.664 | 2300 | 1000 | 12.934 | PEBA 6.13 |
| 38 | 6 | 6.197 | 13 | 17.971 | 1100 | 1000 | 20.684 | PEBA 6.13 |
| 39 | 6 | 11.111 | 13 | 25.38 | 4000 | 1000 | 8.449 | PEBA 6.13-st |
| 40 | 6 | 5.197 | 13 | 17.971 | 1100 | 1000 | 20.684 | PEBA 5.13-st |
| 48 | 6 | 6.056 | 9 | 16.202 | 600 | 650 | 22.691 | PEBA 6.9-st |
| 49 | 6 | 9.310 | 9 | 19.602 | 1083 | 650 | 16.052 | PEBA 6.9-st |
| 50 | 6 | 10.924 | 9 | 21.288 | 1509 | 650 | 12.760 | PEBA 6.9-st |
| 51 | 7 | 11.053 | 10 | 21.058 | 1509 | 650 | 12.861 | PEBA 7.10 |
| 52 | 5 | 9.702 | 12 | 24.409 | 1760 | 650 | 11.493 | PEBA 5.12 |
| 53 | 7 | 9.952 | 12 | 22.065 | 1509 | 650 | 12.954 | PEBA 7.12 |
| 54 | 7 | 5.095 | 12 | 16.917 | 600 | 650 | 22.937 | PEBA 7.12 |
| 55 | 7 | 9.014 | 14 | 22.923 | 1509 | 650 | 13.034 | PEBA 7.14 |
| 56 | 12 | 12.410 | 9 | 16.251 | 1083 | 650 | 15.302 | PEBA 12.9-st |
| 57 | 12 | 8.030 | 9 | 14.000 | 600 | 650 | 22.919 | PEBA 12.9-st |

TABLE 1-continued

PEBA prepared

| Experiment | Diamine | Initial weight of diamine | Dicarboxylic acid | Initial weight of dicarboxylic acid | Mn of subunit 1 | Mn of pTHF | Initial weight of pTHF | Product |
|---|---|---|---|---|---|---|---|---|
| 58 | 6 | 8.789 | 13 | 23.219 | 1509 | 650 | 12.963 | PEBA 6.13-st |
| 59 | 7 | 9.465 | 13 | 22.510 | 1509 | 650 | 12.996 | PEBA 7.13 |
| 60 | 7 | 4.710 | 13 | 17.246 | 600 | 650 | 22.993 | PEBA 7.13 |

All initial weights in kg
diamine 5 = 1,5-diaminopentane
diamine 6 = hexamethylenediamine
diamine 7 = 1,7-diaminoheptane
diamine 10 = 1,10-decamethylenediamine
dicarboxylic acid 9 = azelaic acid
dicarboxylic acid 10 = sebacic acid
dicarboxylic acid 12 = dodecanedioic acid
dicarboxylic acid 13 = brassylic acid
dicarboxylic acid 14 = tetradecanedieic acid
pTHF = polytetrahydrofuran
suffix "st": stabilized with stabilizer mixture The PEBA prepared were investigated in respect of appearance of the extrudate, relative viscosity $\eta_{rel}$ and melting point Tm (cf. Table 2). Appearance of the extrudate: visual inspection. Viscosity: ISO 307. Tm: DSC, second heating step to ISO 11357.

TABLE 2

Properties of the PEBA prepared

| Experiment | Product | Appearance of the extrudate | $\eta_{rel}$ | Tm (DSC, second heating step) |
|---|---|---|---|---|
| 1 | PEBA 6.10 | translucent | 1.81 | 219 |
| 2 | PEBA 6.10 | translucent | 1.83 | 214 |
| 3 | PEBA 6.10 | translucent | 1.96 | 210 |
| 4 | PEBA 6.10-st | translucent | 1.81 | 219 |
| 5 | PEBA 6.10-st | translucent | 1.83 | 214 |
| 6 | PEBA 6.10-st | translucent | 1.96 | 210 |
| 7 | PEBA 6.13 | translucent | 1.87 | 199 |
| 8 | PEBA 6.13 | translucent | 1.84 | 195 |
| 9 | PEBA 6.13 | translucent | 1.9 | 191 |
| 10 | PEBA 6.13 | translucent | 1.96 | 185 |
| 11 | PEBA 6.13-st | translucent | 1.87 | 199 |
| 12 | PEBA 6.13-st | translucent | 1.84 | 195 |
| 13 | PEBA 6.13-st | translucent | 1.9 | 191 |
| 14 | PEBA 6.13-st | translucent | 1.96 | 185 |
| 15 | PEBA 10.10 | translucent | 1.75 | 194 |
| 16 | PEBA 10.10 | translucent | 1.94 | 184 |
| 17 | PEBA 10.10 | translucent | 1.85 | 179 |
| 19 | PEBA 10.13 | translucent | 1.9 | 166 |
| 20 | PEBA 10.13 | translucent | 1.85 | 172 |
| 21 | PEBA 10.13 | translucent | 1.83 | 175 |
| 22 | PEBA 10.13 | translucent | 1.9 | 164 |
| 23 | PEBA 10.13-st | translucent | 1.9 | 166 |
| 24 | PEBA 10.13-st | translucent | 1.85 | 172 |
| 25 | PEBA 10.13-st | translucent | 1.83 | 175 |
| 26 | PEBA 10.13-st | translucent | 1.9 | 164 |
| 27 | PEBA 10.9 | translucent | 1.86 | 179 |
| 28 | PEBA 10.9 | translucent | 1.86 | 177 |
| 29 | PEBA 10.9 | translucent | 1.87 | 172 |
| 30 | PEBA 10.9 | translucent | 1.89 | 168 |
| 31 | PEBA 10.9 | translucent | 1.76 | 153 |
| 32 | PEBA 10.9-st | translucent | 1.86 | 179 |
| 33 | PEBA 10.9-st | translucent | 1.86 | 177 |
| 34 | PEBA 10.9-st | translucent | 1.87 | 172 |
| 35 | PEBA 10.9-st | translucent | 1.89 | 168 |
| 36 | PEBA 6.13 | white/opaque | 1.86 | 195 |
| 37 | PEBA 6.13 | white/opaque | 1.88 | 193 |
| 38 | PEBA 6.13 | white/opaque | 2.19 | 188 |
| 39 | PEBA 6.13-st | white/opaque | 1.86 | 195 |
| 40 | PEBA 6.13-st | white/opaque | 2.19 | 188 |
| 48 | PEBA 6.9-st | milky-white | 1.97 | 195 |
| 49 | PEBA 6.9-st | milky-white | 1.89 | 203 |
| 50 | PEBA 6.9-st | milky-white | 1.81 | 204 |
| 51 | PEBA 7.10 | milky/cloudy | 1.73 | 199 |
| 52 | PEBA 5.12 | milky/cloudy | 1.21 | 198 |
| 53 | PEBA 7.12 | translucent | 1.6 | 189 |
| 54 | PEBA 7.12 | translucent | 2.01 | 183 |
| 55 | PEBA 7.14 | translucent | 1.85 | 173 |
| 56 | PEBA 12.9-st | translucent | 1.93 | 173 |
| 57 | PEBA 12.9-st | translucent | 1.76 | 151 |
| 58 | PEBA 6.13-st | translucent | 1.79 | 186 |
| 59 | PEBA 7.13 | cloudy | 1.48 | 170 |
| 60 | PEBA 7.13 | cloudy | 1.84 | 177 |

Commercially available PEBA based on PA 12 or PA 11 were also investigated. These are available from Evonik (Vestamid®) or Arkema (PEBAX®).

Testing of the Polyether Block Amides Prepared

Deposit Test

Injection-moulded plaques measuring 60 mm×80 mm×2 mm were produced from the polyether block amides as test specimens. The formation of deposits was ascertained after the test specimen had been stored for a test period of 10 days in a closed vessel with water vapour saturation at 75° C. Deposits were assessed visually using a four-point scale (from 0-3, where 0=free of deposits and 3=subject to heavy deposits).

For some specimens, no deposit tests were performed. In these cases, no entry is made in the following tables.

Determination of Translucency

The translucency of the aforementioned test specimens was ascertained visually. In this case the following evaluation was used (in decreasing order of translucency):

0=translucent ++
1=translucent +
2=translucent 0
3=opaque/milky, translucent 0
4=opaque/milky, translucent −
5=milky-white Determination of Haze Value The haze value specifies the illumination through an article in transmitted light. The haze value is measured here by means of the 60×60×2 mm plaques to ASTM standard D 1003 using a Konica-Minolta CM-3800d. Where the specimen was opaque/milky or even milky-white, determination of the haze value was usually dispensed with.

TABLE 3

Test results of PEBA 6.10-650 (non-inventive)

| Experiment | Product | Mn of subunit 1 | Mn of subunit 2 | Deposit test | Haze value | Translucency (visual) |
|---|---|---|---|---|---|---|
| 1 | PEBA 6.10 | 2300 | 650 | 1 | — | 4 |
| 2 | PEBA 6.10 | 1100 | 650 | 0-1 | — | 4 |
| 3 | PEBA 6.10 | 800 | 650 | 1 | — | 4 |
| 4 | PEBA 6.10-st | 2300 | 650 | 1 | — | 4 |
| 5 | PEBA 6.10-st | 1100 | 650 | 1-2 | — | 4 |
| 6 | PEBA 6.10-st | 800 | 650 | 1-2 | — | 4 |

Despite some good deposit test results, the specimens of PEBA 6.10 exhibit insufficiently low translucency.

TABLE 4

Test results of PEBA 6.13-650 (according to the invention)

| Experiment | Product | Mn of subunit 1 | Mn of subunit 2 | Deposit test | Haze value | Translucency (visual) |
|---|---|---|---|---|---|---|
| 7 | PEBA 6.13 | 2300 | 650 | 0 | 60.1 | 2 |
| 8 | PEBA 6.13 | 1100 | 650 | 0-1 | 33.8 | 1 |
| 9 | PEBA 6.13 | 800 | 650 | 0-1 | 20.0 | 0 |
| 10 | PEBA 6.13 | 600 | 650 | 0-1 | 5.3 | 0 |
| 11 | PEBA 6.13-st | 2300 | 650 | 0-1 | 56.1 | 2 |
| 58 | PEBA 6.13-st | 1509 | 650 | 0 | 66.0 | 0-1 |
| 12 | PEBA 6.13-st | 1100 | 650 | 0 | 28.3 | 1 |
| 13 | PEBA 6.13-st | 300 | 650 | 0-1 | 15.3 | 0 |
| 14 | PEBA 6.13-st | 600 | 650 | 1-2 | 5.8 | 0 |

PEBA 6.13 satisfies both the deposit test and the requirements on translucency.

TABLE 5

Test results of PEBA 10.10-650 and 7.13-650 (non-inventive)

| Experiment | Product | Mn of subunit 1 | Mn of subunit 2 | Deposit test | Haze value | Translucency (visual) |
|---|---|---|---|---|---|---|
| 15 | PEBA 10.10 | 2268 | 650 | 0-1 | — | 3 |
| 16 | PEBA 10.10 | 1083 | 650 | 1-2 | — | 3 |
| 17 | PEBA 10.10 | 780 | 650 | 2-3 | — | 3 |
| 59 | PEBA 7.13 | 1509 | 650 | 0 | — | 3 |
| 60 | PEBA 7.13 | 600 | 650 | 2 | — | 2 |

The test specimens of PEBA 10.10 and PEBA 7.13 are opaque/milky with low translucency or (Example 60) have a certain transparency with increased deposits.

TABLE 6

Test results of PEBA 10.13-650 (non-inventive)

| Experiment | Product | Mn of subunit 1 | Mn of subunit 2 | Deposit test | Haze value | Translucency (visual) |
|---|---|---|---|---|---|---|
| 19 | PEBA 10.13 | 4096 | 650 | 2 | 63.3 | 2 |
| 20 | PEBA 10.13 | 2263 | 650 | 2 | 49.1 | 1 |
| 21 | PEBA 10.13 | 1509 | 650 | 2 | 23.4 | 0 |
| 22 | PEBA 10.13 | 1068 | 650 | 2 | 16.5 | 0 |
| 23 | PEBA 10.13-st | 4096 | 650 | 2 | 61.3 | 1 |

TABLE 6-continued

Test results of PEBA 10.13-650 (non-inventive)

| Experiment | Product | Mn of subunit 1 | Mn of subunit 2 | Deposit test | Haze value | Translucency (visual) |
|---|---|---|---|---|---|---|
| 24 | PEBA 10.13-st | 2268 | 650 | 2 | 37.7 | 2 |
| 25 | PEBA 10.13-st | 1509 | 650 | 2 | 22.4 | 1 |
| 26 | PEBA 10.13-st | 1063 | 650 | 2 | 17.0 | 0 |

Although both the non-stabilized and the stabilized PEBA 10.13 do exhibit a moderate to good translucency, these specimens do not pass the deposit test.

TABLE 7

Test results of PEBA 10.9-650 (according to the invention)

| Experiment | Product | Mn of subunit 1 | Mn of subunit 2 | Deposit test | Haze value | Translucency (visual) |
|---|---|---|---|---|---|---|
| 27 | PEBA 10.9 | 4096 | 650 | 0-1 | 80.2 | 2 |
| 28 | PEBA 10.9 | 2263 | 650 | 1 | 60.2 | 1 |
| 29 | PEBA 10.9 | 1509 | 650 | 0 | 41.1 | 0 |
| 30 | PEBA 10.9 | 1068 | 650 | 0 | 30.8 | 0 |
| 31 | PEBA 10.9 | 600 | 650 | 0 | 22.3 | 0 |
| 33 | PEBA 10.9-st | 4096 | 650 | 1 | 71.4 | 0 |
| 33 | PEBA 10.9-st | 2268 | 650 | 0-1 | 71.7 | 2 |
| 34 | PEBA 10.9-st | 1509 | 650 | 0 | 39.2 | 1 |
| 35 | PEBA 10.9-st | 1068 | 650 | 0 | 25.9 | 0 |

PEBA 10.9 exhibits few to no deposits whatsoever and a good to moderate translucency.

TABLE 8

Test results of PEBA 6.13-1000 (non-inventive)

| Experiment | Product | Mn of subunit 1 | Mn of subunit 2 | Deposit test | Haze value | Translucency (visual) |
|---|---|---|---|---|---|---|
| 36 | PEBA 6.13 | 4000 | 1000 | — | 101 | 5 |
| 37 | PEBA 6.13 | 2300 | 1000 | — | 102 | 5 |
| 38 | PEBA 6.13 | 1100 | 1000 | — | 102 | 5 |
| 39 | PEBA 6.13-st | 4000 | 1000 | — | 101 | 5 |
| 40 | PEBA 6.13-st | 1100 | 1000 | — | 102 | 5 |

PEBA 6.13, having a polyether subunit the molar mass of which is 1000, leads to milky-white test specimens. In contrast, PEBA 6.13 specimens having a polyether subunit of 650 g/mol exhibit moderate to good translucency (Experiments 7 to 14).

TABLE 9

Test results using commercially available PEBA

| Experiment | Product | Deposit test | Translucency (visual) |
|---|---|---|---|
| 41 | Vestamid E55-S3 | 1-2 | 4 |
| 42 | Vestamid E62-S3 | 1-2 | 4 |
| 43 | Vestamid E40-S3 | 1-2 | 4 |
| 44 | Vestamid E26-S3 | 2-3 | 1 |
| 45 | PEBAX Rnew 55R53 | 1-2 | 1 |
| 46 | PEBAX 6333 | 1-2 | 4 |
| 47 | PEBAX C | 1-2 | 4 |

The deposit test shows a moderate result for commercially available PEBA based on PA 11 or PA 12. The translucency in most cases turns out to be very low.

TABLE 10

Test results of PEBA 6.9-650, PEBA 7.10-650 and 5.12-650 (non-inventive)

| Experiment | Product | Mn of subunit 1 | Mn of subunit 2 | Deposit test | Haze value | Translucency (visual) |
|---|---|---|---|---|---|---|
| 48 | PEBA 6.9-st | 1509 | 650 | 0 | 100.7 | 5 |
| 49 | PEBA 6.9-st | 1083 | 650 | 0 | 101.7 | 5 |
| 50 | PEBA 6.9-st | 600 | 650 | 0-1 | 102 | 5 |
| 51 | PEBA 7.10 | 1509 | 650 | 0 | — | 3 |
| 52 | PEBA 5.12 | 1760 | 650 | 3 | — | 4 |

Specimens containing PEBA 6.9, PEBA 7.10 and 5.12 exhibit opaque/milky to milky-white test specimens.

TABLE 11

Test results of 7.12-650, 14-650 and 12.9-650 (according to the invention)

| Experiment | Product | Mn of subunit 1 | Mn of subunit 2 | Deposit test | Haze value | Translucency (visual) |
|---|---|---|---|---|---|---|
| 53 | PEBA 7.12 | 1509 | 650 | 1 | — | 0-1 |
| 54 | PEBA 7.12 | 600 | 650 | 1 | — | 0-1 |
| 55 | PEBA 7.14 | 1509 | 650 | 1 | — | 0-1 |
| 56 | PEBA 12.9-st | 1083 | 650 | 0 | 49.0 | 0-1 |
| 57 | PEBA 12.9-st | 600 | 650 | 0 | 39.0 | 0-1 |

Test specimens containing PEBA 7.12, 7.14 or 12.9 exhibit few to no deposits and high transparency.

The invention claimed is:

1. A moulding composition, comprising:
polyether block amide (PEBA) having a subunit 1 and a subunit 2,
wherein the subunit 1 comprises at least one linear aliphatic diamine containing 5 to 15 carbon atoms and at least one linear aliphatic dicarboxylic acid containing 6 to 16 carbon atoms, the subunit 2 comprises at least one polyether diol selected from the group consisting of polypropane-1,3-diol, polytetramethylene glycol, and mixtures thereof, a sum total of the carbon atoms from the diamine and the dicarboxylic acid is 19 or 21 carbon atoms; and
a number-average molar mass of the subunit 2 is 400-700 g/mol and subunit 1 has a number-average molar mass of 500 to 1,800 g/mol, and a haze value of the PEBA is about 66 or lower, as measured by means of 60×60×2 mm plaques to ASTM standard D 1003 using a Konica-Minolta CM-3600d.

2. The moulding composition according to claim 1, wherein the number of carbon atoms in the diamine is an even number and the number of carbon atoms in the dicarboxylic acid is an odd number.

3. The moulding composition according to claim 1, wherein the sum total of the carbon atoms from diamine and dicarboxylic acid is 19.

4. The moulding composition according to claim 1, wherein the subunit 1 is selected from the group consisting of nylon-6,13, nylon-10,9, and nylon-12,9.

5. The moulding composition according to claim 1, wherein the linear aliphatic diamine has 6 to 12 carbon atoms.

6. The moulding composition according to claim 1, wherein the dicarboxylic acid has 6 to 14 carbon atoms.

7. A moulded article, produced from the moulding composition according to claim 1.

8. The moulded article according to claim 7, wherein said article is a moulding, a film, a bristle, a fibre, or a foam.

9. The moulded article according to claim 7, wherein the moulded article is produced by a process selected from the group consisting of compression-moulding, foaming, extrusion, coextrusion, blow moulding, 3D blow moulding, coextrusion blow moulding, coextrusion 3D blow moulding, coextrusion suction blow moulding, and injection moulding.

10. The moulded article according to claim 7, wherein said article is a fibre composite component, a shoe sole, a top sheet for skis or snowboards, a spectacle frame, a design article, a sealing material, a body protection, an insulating material, or a housing part provided with a film.

* * * * *